United States Patent
Park et al.

(10) Patent No.: US 11,247,555 B2
(45) Date of Patent: Feb. 15, 2022

(54) POWER TRAIN FOR ELECTRIC VEHICLE

(71) Applicants: Hyundai Motor Company, Seoul (KR); Kia Motors Corporation, Seoul (KR)

(72) Inventors: Jong Yun Park, Hwaseong-si (KR); Jin Seung Lim, Seoul (KR); Byung Dae Choi, Seoul (KR); Sung Wha Hong, Hwaseong-si (KR); Dong Woo Gwak, Hwaseong-si (KR); Hyeon Jin Kim, Suwon-si (KR); Seong Eun Yun, Bucheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 48 days.

(21) Appl. No.: 17/012,775

(22) Filed: Sep. 4, 2020

(65) Prior Publication Data
US 2021/0370764 A1    Dec. 2, 2021

(30) Foreign Application Priority Data

May 26, 2020  (KR) .......................... 10-2020-0063000

(51) Int. Cl.
*B60K 17/02*    (2006.01)
*B60K 1/00*    (2006.01)
(Continued)

(52) U.S. Cl.
CPC ................ *B60K 17/02* (2013.01); *B60K 1/00* (2013.01); *B60K 17/046* (2013.01); *B60K 17/12* (2013.01); *B60K 17/16* (2013.01)

(58) Field of Classification Search
CPC ...... B60K 17/02; B60K 17/046; B60K 17/12; B60K 17/16; F16H 3/48;
(Continued)

(56) References Cited

U.S. PATENT DOCUMENTS 10,711,866 B2 *  7/2020  Mordukhovich ...... B60K 17/08
10,955,030 B2 *  3/2021  Mordukhovich ......... F16H 3/46
(Continued)

FOREIGN PATENT DOCUMENTS

KR       2012-0005101 A       1/2012

*Primary Examiner* — Tinh Dang
(74) *Attorney, Agent, or Firm* — Morgan, Lewis & Bockius LLP (57) ABSTRACT

A power train for an electric vehicle may include an input shaft to which a motor is fixedly connected; a driving gear rotatably mounted on the input shaft; an output shaft disposed in parallel to the input shaft; a driven gear fixed to the output shaft and gear-engaged with the driving gear; a planetary gear set including first, second and third rotation elements wherein the first rotation element is fixedly connected to the input shaft and the second rotation element is fixedly connected to the driving gear, and the third rotation element is restrained from rotating; a friction clutch configured for selectively connecting the input shaft to the driving gear and configured for selectively connecting the input shaft to the driving gear; and a restraining device provided to the third rotation element to implement two states so that only one-way rotation of the third rotation element of the planetary gear set is restrained or two-way rotation thereof is restrained.

10 Claims, 5 Drawing Sheets

(51) Int. Cl.
*B60K 17/04* (2006.01)
*B60K 17/12* (2006.01)
*B60K 17/16* (2006.01)

(58) Field of Classification Search
CPC ..... F16H 2200/0021; F16H 2200/0034; F16H 2200/2005; F16H 2200/2035
See application file for complete search history.

(56) References Cited

U.S. PATENT DOCUMENTS 11,028,906 B2 * 6/2021 Torii ....................... F16D 49/08
2019/0113109 A1 * 4/2019 Mordukhovich ....... F16H 3/663

* cited by examiner

POWER TRAIN FOR ELECTRIC VEHICLE

CROSS REFERENCE TO RELATED APPLICATION

The present application claims priority to Korean Patent Application No. 10-2020-0063000, filed May 26, 2020, the entire contents of which is incorporated herein for all purposes by this reference.

BACKGROUND OF THE INVENTION

Field of the Invention

The present invention relates to a power train for an electric vehicle, and more particularly, to a structure of the power train in which power of a motor may be transmitted to a driving wheel after gear shifting.

Description of Related Art

In an electric vehicle, a rotational force generated from an electric motor (hereinafter referred to as "the motor") is transmitted to a driving wheel to drive the vehicle.

The related art mainly utilizes a power transmission structure in which power generated from the motor is transmitted to the driving wheel after being decelerated by a simple decelerator. Recently, efforts have been made to transmit power from the motor to the driving wheel in a more efficient way, extending an allowable mileage of the vehicle and improving driving performance.

The contents referred to as the related art have been provided only to assist in understanding the background of the present invention and may not be considered as corresponding to the related art known to those having ordinary skill in the art.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a power train for an electric vehicle configured for providing two gear-shift ratios while having a relatively simple configuration, reducing a volume of a motor used and a weight of the vehicle depending thereon, changing an operating point of the motor, and entering a neutral state in which the motor is disconnected from a driving wheel, so that fuel efficiency of the vehicle may be improved.

According to various exemplary embodiments of the present invention, a power train for an electric vehicle includes: an input shaft to which a motor is fixedly connected; a driving gear rotatably mounted on the input shaft; an output shaft disposed in parallel to the input shaft; a driven gear fixed to the output shaft and gear-engaged with the driving gear; a planetary gear set including first, second and third rotation elements wherein the first rotation element is fixedly connected to the input shaft and the second rotation element is fixedly connected to the driving gear, and the third rotation element is restrained from rotating; a friction clutch configured for selectively connecting the input shaft to the driving gear; and a restraining device provided to the third rotation element to implement two states so that only one-way rotation of the third rotation element of the planetary gear set is restrained or two-way rotation thereof is restrained.

The restraining device may include: a one-way clutch mounted to selectively restrain the one-way rotation of the third rotation element of the planetary gear set; and a dog clutch mounted to selectively connect the third rotation element to a transmission housing to restrain the two-way rotation of the third rotation element of the planetary gear set.

The dog clutch may include: a fixed shaft having one end portion fixed to the transmission housing to be coaxial with the input shaft; a hub connected to the third rotation element of the planetary gear set in a state where it is rotatable about the fixed shaft; a clutch gear fixed to the transmission housing; and a sleeve provided to slide rectilinearly along an axial direction of the fixed shaft on the hub to selectively connect the hub to the clutch gear.

In the one-way clutch, an internal race may be mounted on the fixed shaft, and an external race may be mounted on the hub.

In the planetary gear set, the first rotation element may be a sun gear, the second rotation element may be a planet carrier, and the third rotation element may be a ring gear.

The output shaft may include an output gear; and a ring gear of differential gearing may be tooth-engaged with the output gear.

The friction clutch may be configured in a normally-closed type clutch to transmit power in a closed state unless a separate operating force is applied to the clutch.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
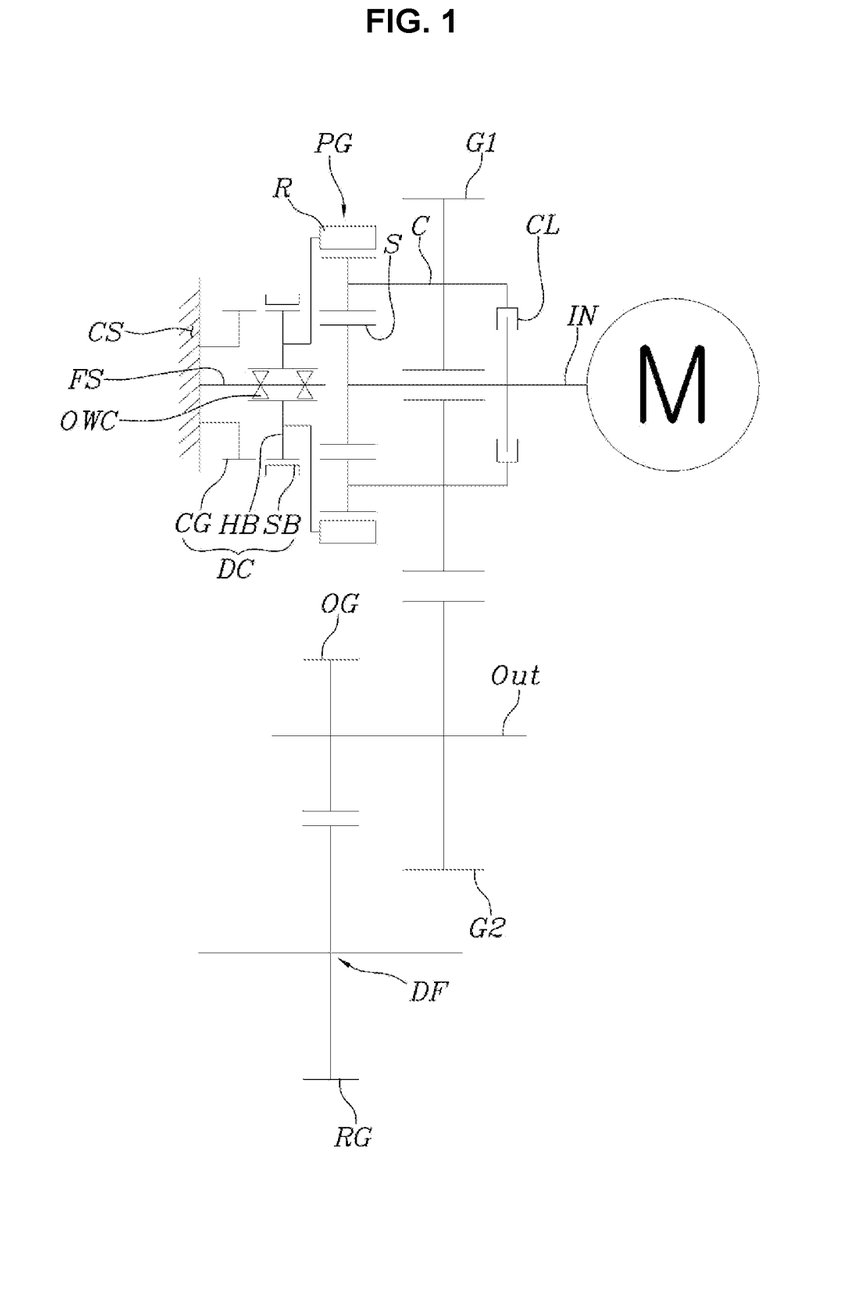
FIG. 1 is a schematic diagram illustrating an exemplary embodiment of a power train for an electric vehicle according to various exemplary embodiments of the present invention.

Referring to FIG. 1, a power train for an electric vehicle according to various exemplary embodiments of the present invention includes: an input shaft IN to which a motor M is connected; a driving gear rotatably mounted on the input shaft IN; an output shaft OUT mounted in parallel to the input shaft IN; a driven gear G2 bound to the output shaft OUT and tooth-engaged with the driving gear G1; a planetary gear set PG including three rotation elements whose first rotation element and second rotation element are connected to the input shaft IN and the driving gear G1, respectively, and third rotation element is restrained from rotating; a friction clutch CL mounted for regulation between the input shaft IN and the driving gear G1; and a restraining device provided to the third rotation element to implement two states so that only one-way rotation of the third rotation element of the planetary gear set PG may be restrained or two-way rotation thereof is restrained.

That is, in various exemplary embodiments of the present invention, power of the motor M provided to the input shaft IN is output to the output shaft OUT through the driving gear G1 and the driven gear G2 after gear shifting through the planetary gear set PG, and the planetary gear set PG may implement a state where the power of the input shaft IN is transmitted to the driving gear G1 after being decelerated and a state where the power of the input shaft IN is transmitted intactly to the driving gear G1, implementing two gear-shift ratios in total.

The restraining device is for restraining the third rotation element of the planetary gear set PG to implement a first-gear state. In various exemplary embodiments of the present invention, the restraining device includes a one-way clutch OWC mounted to restrain the only one-way rotation of the third rotation element of the planetary gear set PG and a dog clutch DC mounted to connect the third rotation element to a transmission housing CS to restrain the two-way rotation of the third rotation element of the planetary gear set PG.

The dog clutch DC includes: a fixed shaft FS having one end portion fixed to the transmission housing CS to be coaxial with the input shaft IN; a hub HB connected to the third rotation element of the planetary gear set PG while in a state where it is rotatable about the fixed shaft FS; a clutch gear CG fixed to the transmission housing CS; and a sleeve SB provided to slide rectilinearly along an axial direction of the fixed shaft FS on the hub HB to connect the hub HB to the clutch gear CG.

Thus, when the sleeve SB is coupled to the clutch gear CG, the hub HB is connected and fixed to the clutch gear CG, as a result restraining the two-way rotation of the third rotation element of the planetary gear set PG.

Meanwhile, in the one-way clutch OWC, an internal race is disposed on the fixed shaft FS, and an external race is disposed on the hub HB.

Therefore, even in a state where the dog clutch DC is not engaged, the one-way clutch OWC enables the hub HB to rotate freely in one direction thereof, but its rotation in the opposite direction is restrained.

Here, the one-way clutch OWC is mounted in such a direction that the hub HB and the third rotation element of the planetary gear set PG are restrained from rotating when the power train according to various exemplary embodiments of the present invention is implemented in a first forward-gear.

In various exemplary embodiments of the present invention, in the planetary gear set PG, the first rotation element is a sun gear S, the second rotation element is a planet carrier C, and the third rotation element is a ring gear R.

Thus, the input shaft IN is directly connected to the sun gear S, the driving gear G1 is directly connected to the planet carrier C, the hub HB of the dog clutch DC is directly connected to the ring gear R, and the friction clutch CL is mounted to connect the sun gear S and the planet carrier C to each other.

The output shaft OUT includes an output gear OG, and a ring gear RG of differential gearing DF is tooth-engaged with the output gear OG to output power to a driving wheel.

Meanwhile, the friction clutch CL is configured in a normally-closed type clutch to transmit power in a closed state unless a separate operating force is applied to the clutch.

Figure 2:
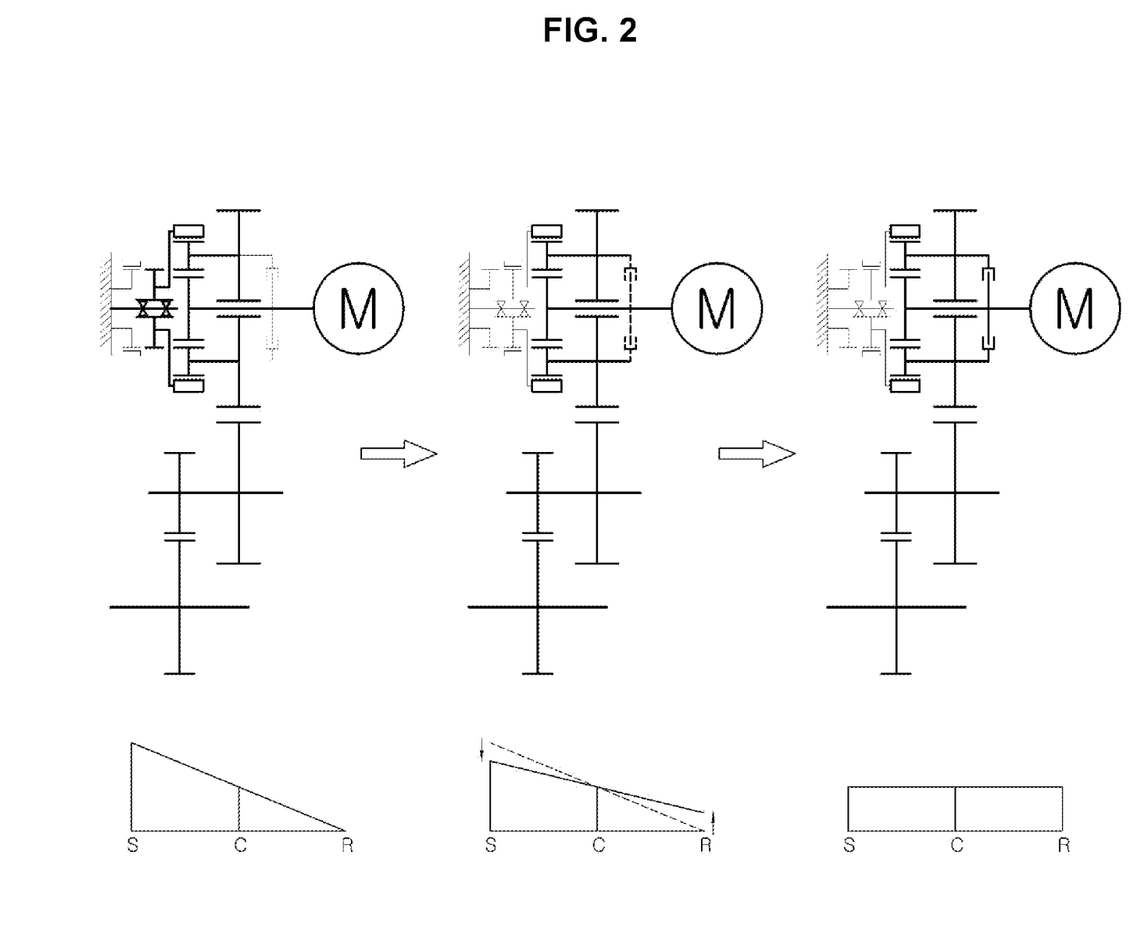
FIG. 2 is a view exemplarily illustrating a process in which the power train of FIG. 1 shifts from a first gear to a second gear.

Referring to FIG. 2, a process in which the power train in the above-described embodiment shifts from a first gear to a second gear will be described.

In the left of FIG. 2, a first-gear state of the power train is illustrated. The first-gear state of the power train is a state where both the dog clutch DC and the friction clutch CL are released. In the first-gear state of the power train, the power of the motor M is transmitted to the sun gear S through the input shaft IN, the power transmitted to the sun gear S is transmitted to the driving gear G1 through the planet carrier C after being decelerated, the power of the driving gear G1 is transmitted to the output shaft OUT through the driven gear G2, and subsequently, the output gear OG drives the ring gear R of the differential gearing DF such that the power is transmitted to the driving wheel.

In the instant case, the ring gear R is required to maintain a fixed state so that the power of the input shaft IN transmitted to the sun gear S may be transmitted to the planet carrier C and the driving gear G1 after being decelerated. At the instant time, the one-way clutch OWC enables the ring gear R to maintain the fixed state.

That is, the rotation of the ring gear R is restrained by the one-way clutch OWC in a direction opposite in a direction in which the sun gear S or the planet carrier C rotate, and the ring gear R rotates freely in the same direction as the sun gear S or the planet carrier C.

For shifting to the second gear in the above-described state, when a frictional force of the friction clutch CL starts to increase as illustrated in the center portion of FIG. 2, a speed of the sun gear S decreases, whereas a speed of the ring gear R starts to increase, as in a diagram enclosed in a lower portion of FIG. 2.

When the friction clutch CL is completely engaged, the sun gear S and the planet carrier C are connected to each other as illustrated in the right of FIG. 2, and the planetary gear set PG is integrated. This is in the same state where the driving gear G1 is integrally fixed to the input shaft IN, and thus, the power of the input shaft IN is transmitted intactly to the driving gear G1, entering a second-gear state.

That is, at the time of shifting from the first gear to the second gear, the frictional force of the friction clutch CL continuously increases, resulting in smooth gear shifting without torque interruption.

Figure 3:
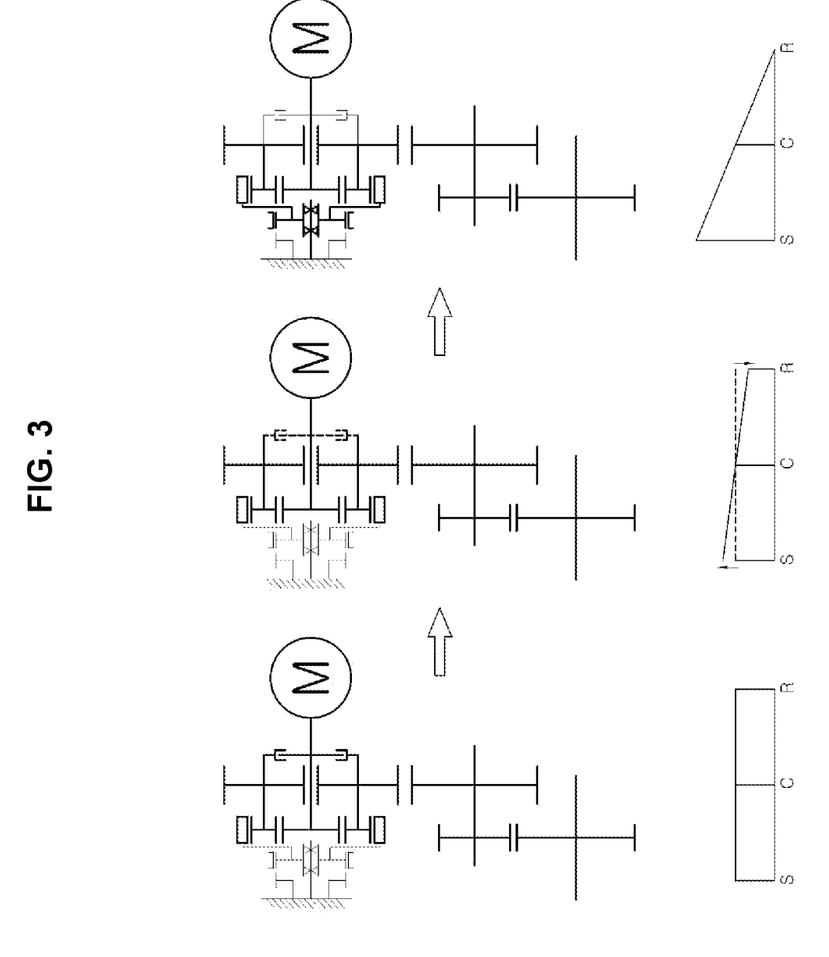
FIG. 3 is a view exemplarily illustrating a process in which the power train of FIG. 1 shifts from the second gear to the first gear.

FIG. 3 illustrates a process of shifting from the second-gear state as described above to the first-gear state. When the friction clutch CL starts to be gradually released from the second-gear state as illustrated in the left of the FIG. 3, the speed of the sun gear S gradually increases and the speed of the ring gear R gradually decreases correspondingly as illustrated in the center portion of FIG. 3, as illustrated in the right of the FIG. 3, the ring gear R is fixed, and the power of the sun gear S is transmitted to the driving gear G1 after being decelerated through the planet carrier C, completing shifting to the first-gear state.

Of course, in the first-gear state, the rotation of the ring gear R in a reverse direction is restrained by the one-way clutch OWC. At the time of shifting from the second gear to the first gear as well, the shifting may be performed smoothly without torque interruption by gradually releasing the friction clutch CL, and it is not required to perform active control for restraining the ring gear R, thus facilitating the control and facilitating the smooth gear shifting.

Figure 4:
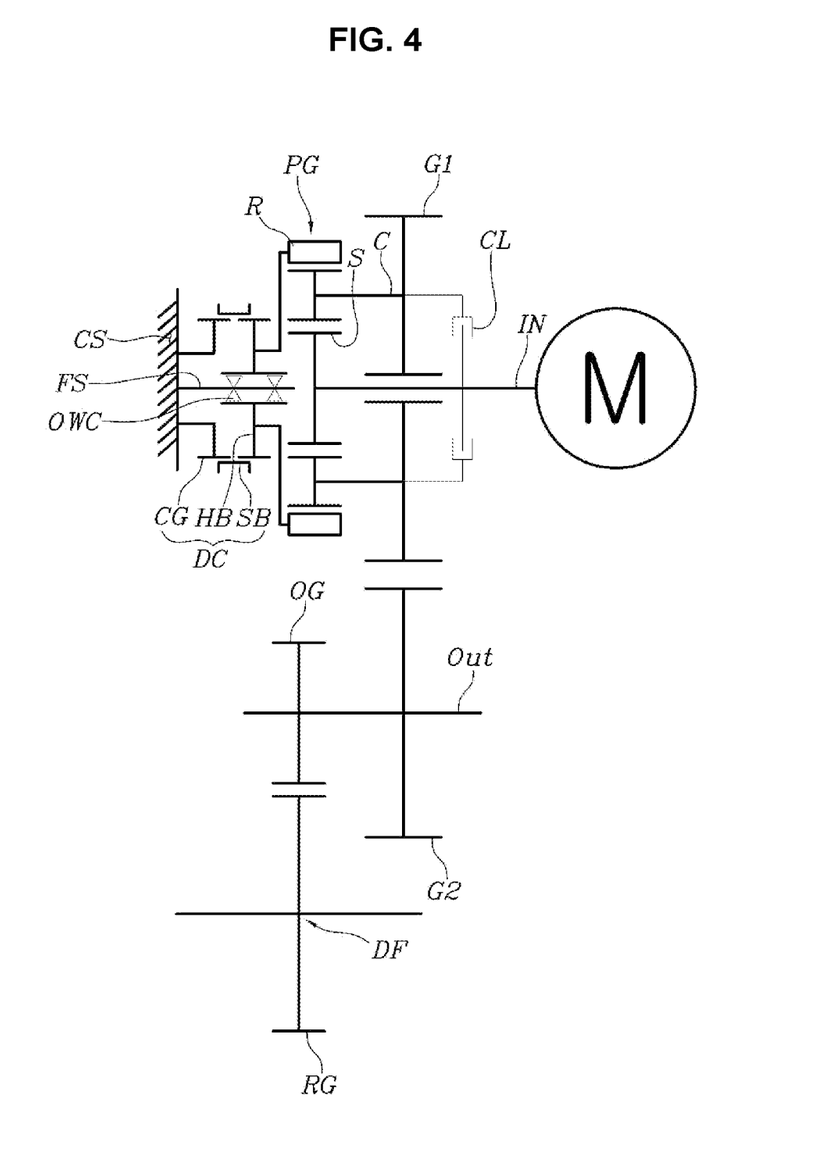
FIG. 4 is a view exemplarily illustrating a state in which the power train of FIG. 1 is implemented in the first gear through a dog clutch.

Here, the first-gear state of the power train is implemented even when the dog clutch DC is engaged as illustrated in FIG. 4. In the instant state, regenerative braking may be implemented, and a reverse gear may easily be implemented by reversely rotating the motor M.

That is, the first-gear state where the dog clutch DC is released and the ring gear R is restrained by the one-way clutch OWC is required to easily and smoothly perform shifting from the first gear to the second gear, and the first-gear state where the dog clutch DC is engaged and the one-way clutch OWC is restrained from freely rotating is required for reverse driving or regenerative braking.

Figure 5:
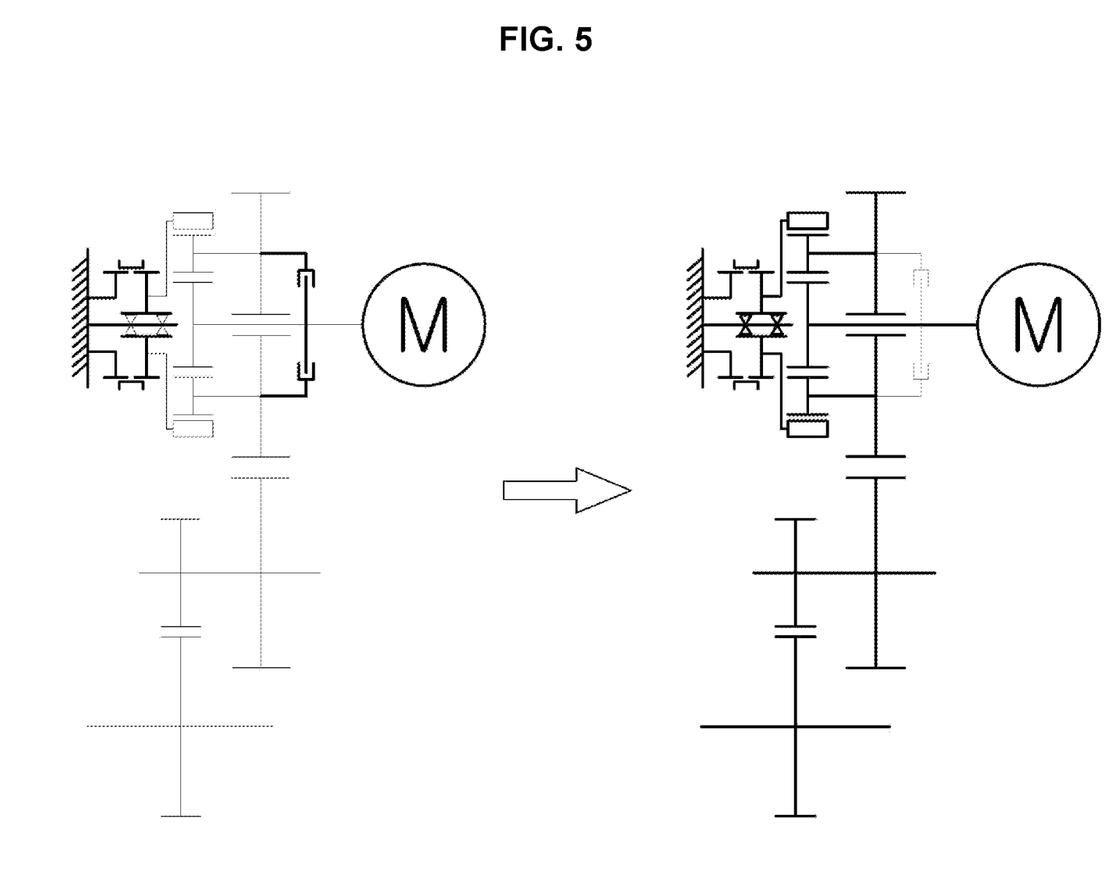
FIG. 5 is a view exemplarily illustrating that a parking function is implemented by the power train of FIG. 1.

Meanwhile, FIG. 5 illustrates that a parking function is implemented by the power train.

That is, since the friction clutch CL is configured in the normally-closed type clutch, when the power train is implemented in the first gear in a state where the dog clutch DC is engaged and then the operating force applied to the clutch CL is released so that a vehicle may enter into a parking state, the friction clutch CL is engaged, and accordingly, the output shaft OUT is consequentially fixed to the transmission housing CS through the driven gear G2, the driving gear G1, the planetary gear set PG, and the dog clutch DC as illustrated in the left of FIG. 5, achieving the parking state in which the output shaft OUT is prevented from rotating.

Conventionally, the parking state is implemented by tooth-engaging a parking sprag as a parking mechanism, resulting in a problem in that a noise or an impact occurs. In contrast, when the parking state is implemented by releasing the operating force of the friction clutch CL in the normally-closed type clutch in the first-gear state based on the dog clutch DC as in various exemplary embodiments of the present invention, it is possible to smoothly switch to the parking state without any noise or impact.

Of course, to release the parking state and drive the vehicle, the friction clutch CL may be open to switch to the first-gear state as illustrated in the right of FIG. 5, and then the motor M may be driven to drive the vehicle in the first gear.

According to various exemplary embodiments of the present invention, it is possible to provide two gear-shift ratios with a relatively simple configuration, reduce a volume of a motor used and a weight of the vehicle depending thereon, change an operating point of the motor, and enter a neutral state in which the motor is disconnected from a driving wheel, so that fuel efficiency of the vehicle may be improved.

Furthermore, the parking function may be implemented by an interlock without having a separate parking mechanism, reducing the number of parts and contributing to a reduction in vehicle weight.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power train apparatus for a vehicle, the power train apparatus comprising:
    an input shaft to which a motor is fixedly connected;
    a driving gear rotatably mounted on the input shaft;
    an output shaft disposed in parallel to the input shaft;
    a driven gear fixed to the output shaft and gear-engaged with the driving gear;
    a planetary gear set including first, second and third rotation elements, wherein the first rotation element is fixedly connected to the input shaft and the second rotation element engaged to the first rotation element is fixedly connected to the driving gear, and the third rotation element engaged to the second rotation element is restrained from rotating;
    a clutch mounted between the input shaft and the driving gear and configured for selectively connecting the input shaft to the driving gear; and
    a restraining device provided to the third rotation element to implement a first state in which one-way rotation of the third rotation element of the planetary gear set is restrained or a second state in which two-way rotation of the third rotation element of the planetary gear set is restrained.

2. The power train apparatus of claim 1, wherein the restraining device includes:

a one-way clutch mounted to selectively restrain the one-way rotation of the third rotation element of the planetary gear set; and a dog clutch mounted to selectively connect the third rotation element to a transmission housing to restrain the two-way rotation of the third rotation element of the planetary gear set.

3. The power train apparatus of claim 2, wherein the dog clutch includes:

a fixed shaft having an end portion fixed to the transmission housing;

a hub connected to the third rotation element of the planetary gear set in a state in which the hub is rotatable about the fixed shaft;

a clutch gear fixed to the transmission housing; and a sleeve provided to slide rectilinearly along an axial direction of the fixed shaft on the hub to selectively connect the hub to the clutch gear.

4. The power train apparatus of claim 3, wherein the fixed shaft is coaxial with the input shaft.

5. The power train apparatus of claim 3, wherein the one-way clutch is mounted on the fixed shaft of the dog clutch.

6. The power train apparatus of claim 3, wherein the hub HB and the third rotation element of the planetary gear set PG are restrained from rotating for restraining the one-way rotation of the third rotation element by the one-way clutch.

7. The power train apparatus of claim 3, wherein in the one-way clutch, an internal race is disposed on the fixed shaft, and an external race is disposed on the hub.

8. The power train apparatus of claim 1, wherein in the planetary gear set, the first rotation element is a sun gear, the second rotation element is a planet carrier, and the third rotation element is a ring gear.

9. The power train apparatus of claim 1, further including an output gear fixed to the output shaft, wherein a ring gear of differential gearing is gear-engaged with the output gear.

10. The power train apparatus of claim 1, wherein the clutch is in a normally-closed type clutch to transmit power in a closed state unless a separate operating force is applied to the clutch.

* * * * *